(12) United States Patent
Grunwald et al.

(10) Patent No.: US 7,726,658 B2
(45) Date of Patent: Jun. 1, 2010

(54) DRIVEN SEAL ASSEMBLY FOR ROTARY DRIVE SHAFT OF MOTOR

(75) Inventors: Michael E. Grunwald, Newton, WI (US); David E. Wasmer, New Holstein, WI (US)

(73) Assignee: Enquatics, Inc., Kiel, WI (US)

(*) Notice: Subject to any disclaimer, the term of this patent is extended or adjusted under 35 U.S.C. 154(b) by 441 days.

(21) Appl. No.: 11/740,476

(22) Filed: Apr. 26, 2007

(65) Prior Publication Data

US 2008/0265515 A1 Oct. 30, 2008

(51) Int. Cl.
F60J 15/34 (2006.01)

(52) U.S. Cl. .................................. 277/366; 277/361

(58) Field of Classification Search ............. 277/361, 277/366, 370, 371, 372, 373, 392, 393
See application file for complete search history.

(56) References Cited

U.S. PATENT DOCUMENTS

| | | | | |
|---|---|---|---|---|
| 1,499,583 | A * | 7/1924 | Leroy | 277/366 |
| 2,559,964 | A | 7/1951 | Jensen | |
| 2,853,020 | A * | 9/1958 | Hollinger et al. | 384/131 |
| 2,937,896 | A * | 5/1960 | Jones | 277/366 |
| 3,042,415 | A * | 7/1962 | Smoll | 277/368 |
| 3,361,431 | A | 1/1968 | Liss et al. | |
| 3,484,113 | A * | 12/1969 | Moore | 277/366 |
| 3,584,887 | A | 6/1971 | Brown | |
| 3,773,337 | A * | 11/1973 | Adams | 277/392 |
| 4,281,839 | A | 8/1981 | Schoenmeyr | |
| 4,586,719 | A | 5/1986 | Marsi et al. | |
| 4,936,593 | A | 6/1990 | Finney | |
| 5,713,576 | A * | 2/1998 | Wasser et al. | 277/304 |
| 5,769,605 | A | 6/1998 | Kung | |
| 5,901,965 | A * | 5/1999 | Ringer et al. | 277/369 |
| 6,196,790 | B1 * | 3/2001 | Sheridan et al. | 415/111 |
| 6,641,140 | B1 * | 11/2003 | Matsumoto et al. | 277/366 |
| 6,685,191 | B2 * | 2/2004 | Toal | 277/370 |
| 7,311,307 | B2 * | 12/2007 | Dahlheimer | 277/373 |
| 2002/0101038 | A1 * | 8/2002 | Budrow et al. | 277/370 |

FOREIGN PATENT DOCUMENTS

JP 04300470 A * 10/1992

* cited by examiner

Primary Examiner—Thomas B Will
Assistant Examiner—Gilbert Y Lee
(74) Attorney, Agent, or Firm—Andrus, Sceales, Starke & Sawall, LLP

(57) ABSTRACT

A driven seal assembly is provided for a shaft rotated by a motor disposed in a motor housing and having a seal housing adjacent to the motor housing through which the shaft extends. A first rotary seal is frictionally fit on the shaft adjacent the first stationary seal seat. A second rotary seal is frictionally fit on the shaft adjacent a second stationary seal seat. A spring surrounds the shaft and provides bi-directional axial forces on the first and second rotary seals against the first and second stationary seal seats. A positive drive mechanism is mounted on the shaft between the first and second rotary seals in a driving, mating relationship therewith and includes a first driving element in driving engagement with the first rotary seal and a second driving element in driving engagement with the second rotary seal.

20 Claims, 4 Drawing Sheets

DRIVEN SEAL ASSEMBLY FOR ROTARY DRIVE SHAFT OF MOTOR

FIELD OF THE INVENTION

The present invention relates to a driven seal assembly for preventing leakage of fluid along a rotary shaft of a motor and into a housing associated with the motor.

BACKGROUND OF THE INVENTION

A mechanical seal assembly is commonly used on a rotating shaft of a motor enclosed in a motor housing, and projecting through a seal housing adjacent the motor housing to prevent water or other fluid from migrating along the shaft and entering the seal and motor housings. One such known application involves a driven seal assembly mounted in a seal housing about the rotating shaft of an electric motor drivingly connected to an impeller of a fountain aerator having its motor housing disposed in a body of water.

Such prior art driven seal assemblies include a pair of stationary seal seats, a pair of rotary seals and a coil spring, all of which are mounted on a shaft driven by the motor. Typically, one stationary seal seat is fixedly mounted in a bore of the seal housing and cooperates with one of the rotary seals. The other stationary seal seat is fixed in a bore of the motor housing and cooperates with the other of the rotary seals. Both rotary seals have internal rubber surfaces that are frictionally fit upon the outer diameter of the shaft so that the rotary seals will rotate with the shaft and provide inner seals along the shaft to prevent water from migration therealong. To maintain a seal between the opposed seal faces of the rotary seals and the stationary seat seals and thus seal the bores in the seal and motor housings, the coil spring is placed under compression between the two rotary seals.

Certain problems may arise with using this type of driven seal assembly on a driven motor shaft. For example during motor operation, the rotary seals are driven by friction of rubber against the shaft. If the friction fit begins to slip, heat is generated and a groove will begin to be worn into the shaft. The rubber surfaces of the rotary seals become glazed, locking of the stationary seal seats and rotary seals may occur, the supple fit of the rotary seals is lost and wear on the shaft will enable water to enter the motor housing and destroy the motor.

Accordingly, there is a need to provide a driven seal assembly that overcomes the problems of the prior art and ensures proper sealing of a rotating shaft relative to seal and motor housings is maintained for prolonged operation of the motor.

SUMMARY OF THE INVENTION

The present invention relates to a driven seal assembly for a shaft rotated by a motor disposed in a motor housing and having a seal housing adjacent to the motor housing through which the shaft extends. A first stationary seal seat is mounted on the shaft and secured in the bore of the seal housing. A first rotary seal is frictionally fit on the shaft adjacent the first stationary seal seat. A second stationary seal seat is mounted on the shaft and secured in the bore of the motor housing. A second rotary seal is frictionally fit on the shaft adjacent the second stationary seal seat. A spring surrounds the shaft and provides bidirectional axial forces on the first and second rotary seals against the first and second stationary seals seats. The invention is improved by a positive drive mechanism mounted on the shaft between the first and second seals in a driving, mating relationship therewith and including a first driving element in driving engagement with the first rotary seal and a second driving element in driving engagement with the second rotary seal. The spring is placed in compression between the first and second driving elements.

The positive drive mechanism includes a third driving element fixed to the shaft between the first and second driving elements and encircled by the spring. The third driving element is connected by pins to the first and second driving elements. The spring encircles axially extending portions of the first and second driving elements. The spring has opposite ends engaged against portions of the first and second driving elements extending radially from the axially extending portions. The first and second driving elements are formed with non-circular cavities for receiving mating non-circular portions of the first and second rotary seals. The shaft passes freely through the cavities of the first and second driving elements.

In another aspect of the invention, a driven seal assembly is provided for a shaft rotated by a motor disposed in a motor housing and having a seal housing adjacent the motor housing through which the shaft extends. The driven seal assembly includes a first stationary seal seat mounted on the shaft and secured in a bore of the seal housing. A first rotary seal is frictionally fit on the shaft adjacent the first stationary seal seat. A first rotor driver is mounted on the shaft in mating relationship with the first rotary seal. A second stationary seal seat is mounted to the shaft and is secured in a bore of the motor housing. A second rotary seal is frictionally fit on the shaft adjacent to the second stationary seal seat. A second rotor driver is mounted on the shaft in mating relationship with the second rotary seal. A set collar is attached to the shaft between the first and second rotor drivers and is drivingly connected thereto. A spring surrounds the set collar and is placed in compression between the first and second rotor drivers. The spring exerts bidirectional forces causing the first and second rotary seals to constantly engage the first and second stationary seal seats respectively, and seal the bores of the seal housing and the motor housing. The set collar, the first and second rotor drivers and the first and second rotary seals define a positive drive mechanism for constantly urging the first and second rotary seals against the first and second stationary seal seats upon rotation of the shaft regardless of the fit between the first and second rotary seals on the shaft.

The first and second stationary seal seats are press fit and non-rotatably mounted in the bores of the seal and motor housings, respectively. The first and second rotary seals are aligned with rubber surfaces that seal against an outer periphery of the shaft. The first and second rotary seals include hexagonally-shaped bosses. The first and second rotor drivers have hexagonally-shaped wall structure matingly engagable with the bosses on the first and second rotary seals. Each of the first and second rotor drivers has a circular crown integrally formed with an annular neck having a diameter less than a diameter of the crown. Each rotor driver is formed with a pair of axially extending apertures spaced substantially 180 degrees apart. The set collar is attached to the shaft by at least one set screw. The set collar is provided with a pair of axially extending pins that are received in the rotor driver apertures. The spring surrounds the necks of the first and second rotor drivers and has opposite ends engaged against inner faces of the circular crowns of the first and second rotor drivers.

BRIEF DESCRIPTION OF THE DRAWINGS

The drawings illustrate the best mode presently contemplated of carrying out the invention.

In the drawings.

DETAILED DESCRIPTION

Figure 1:
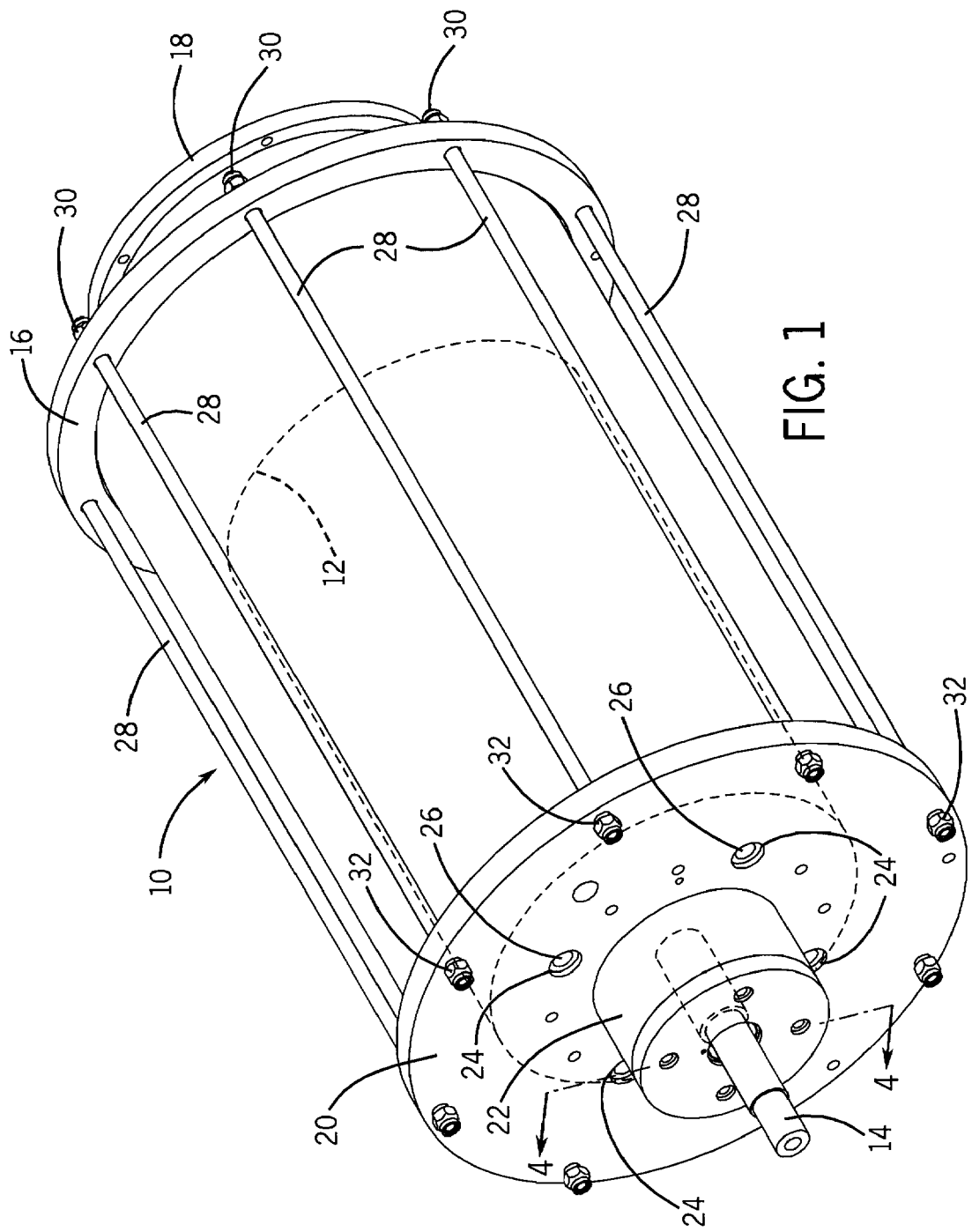
FIG. 1 is a perspective view of a housing for a motor having a driven shaft provided with a driven seal assembly embodying the present invention.

Referring to the drawings, FIG. 1 depicts a generally cylindrical motor housing 10 for protectively enclosing an electric motor 12 having a rotary drive shaft 14 projecting from one end thereof. Although not illustrated, the shaft 14 may be drivingly connected to an impeller of a fountain aerator having motor housing 10 disposed in a body of water. On one end, the motor housing 10 has a bottom plate 16 provided with an electrical enclosure 18 for establishing the necessary electrical connections for the motor 12. On an opposite end, the motor housing 10 has a top plate 20 as well as a seal housing 22 through which the rotary drive shaft 14 passes. The top plate 20 is formed with certain holes 24 to permit the attachment of the motor 12 inside motor housing 10 using fasteners 26. The motor housing 10 is reinforced by a series of elongated rods 28 having bolt heads 30 engaged adjacent bottom plates 16 and threaded ends received in nuts 32 drawn against the top plate 20.

Figure 4:
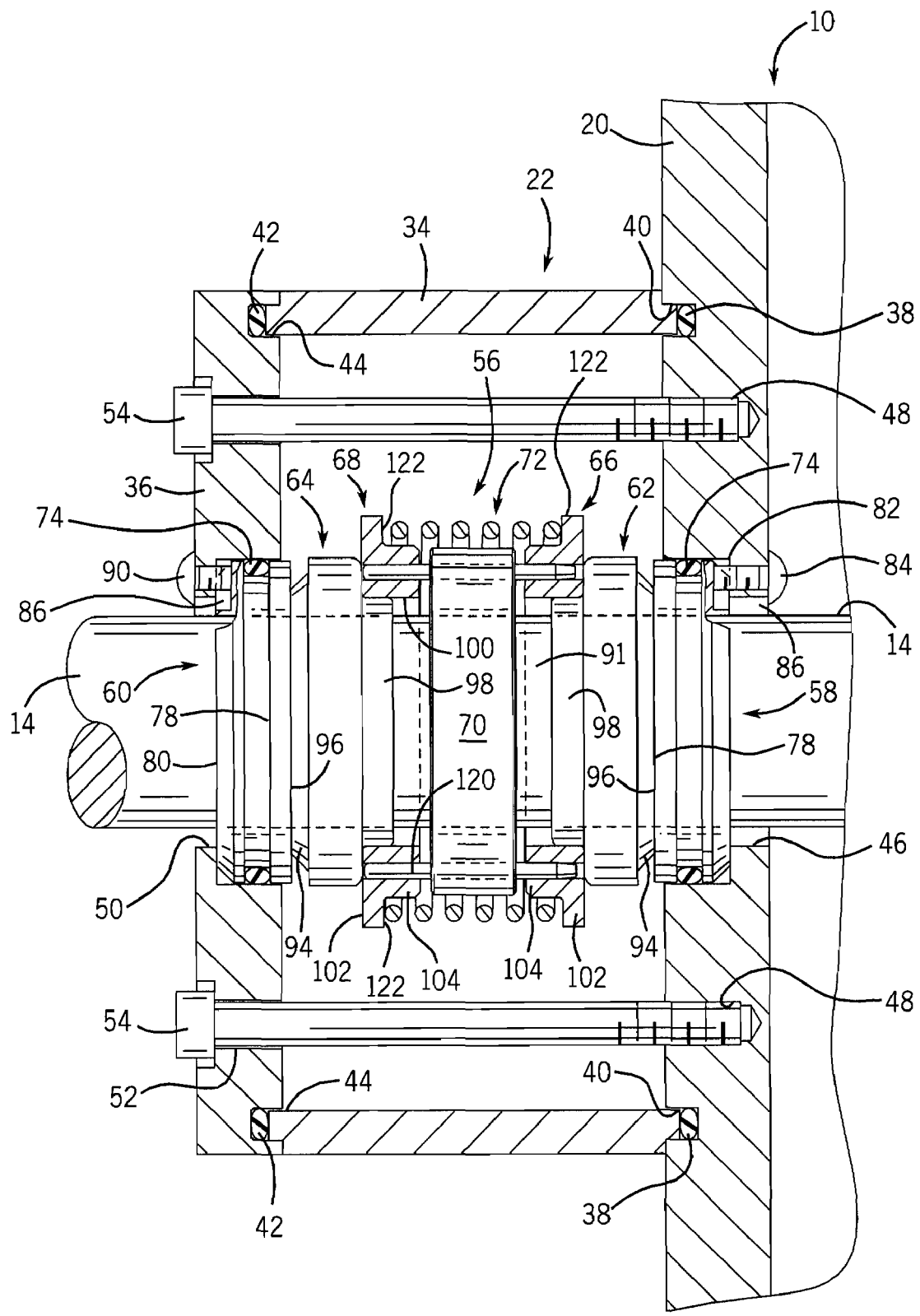
FIG. 4 is a cross-sectional view taken on line 4-4 of FIG. 1.

As seen best in FIG. 4, seal housing 22 is defined by a cylindrical sidewall or cartridge tube 34 and a circular seal top plate 36. A bottom end of the cartridge tube 34 is received along with an O-ring 38 in a circular groove 40 formed in an outside surface of motor housing top plate 20. A top end of the cartridge tube 34 is received along with another O-ring 42 in an annular channel 44 formed on an inside surface of the seal top plate 36. The motor housing top plate 20 is formed with a central opening 46 for receiving the drive shaft 14 therethrough. The motor housing top plate 20 is also configured with a number of threaded blind holes 48 lying between the groove 38 and the central opening 46. The seal top plate 36 is constructed with a central recess 50 that is aligned with the central opening 46 in the motor housing top plate 20 for receiving the drive shaft 14 therethrough. The seas top plate 36 is designed with a plurality of bores 52 aligned with the threaded blind holes 48. Bolts 54 are passed through the bores 52 and threaded into the threaded blind holes 48 to attach the seal housing 22 to the motor housing top plate 20. Although not shown, it is preferable to include an O-ring and a washer around bolt 54 adjacent the head thereof.

Figure 2:
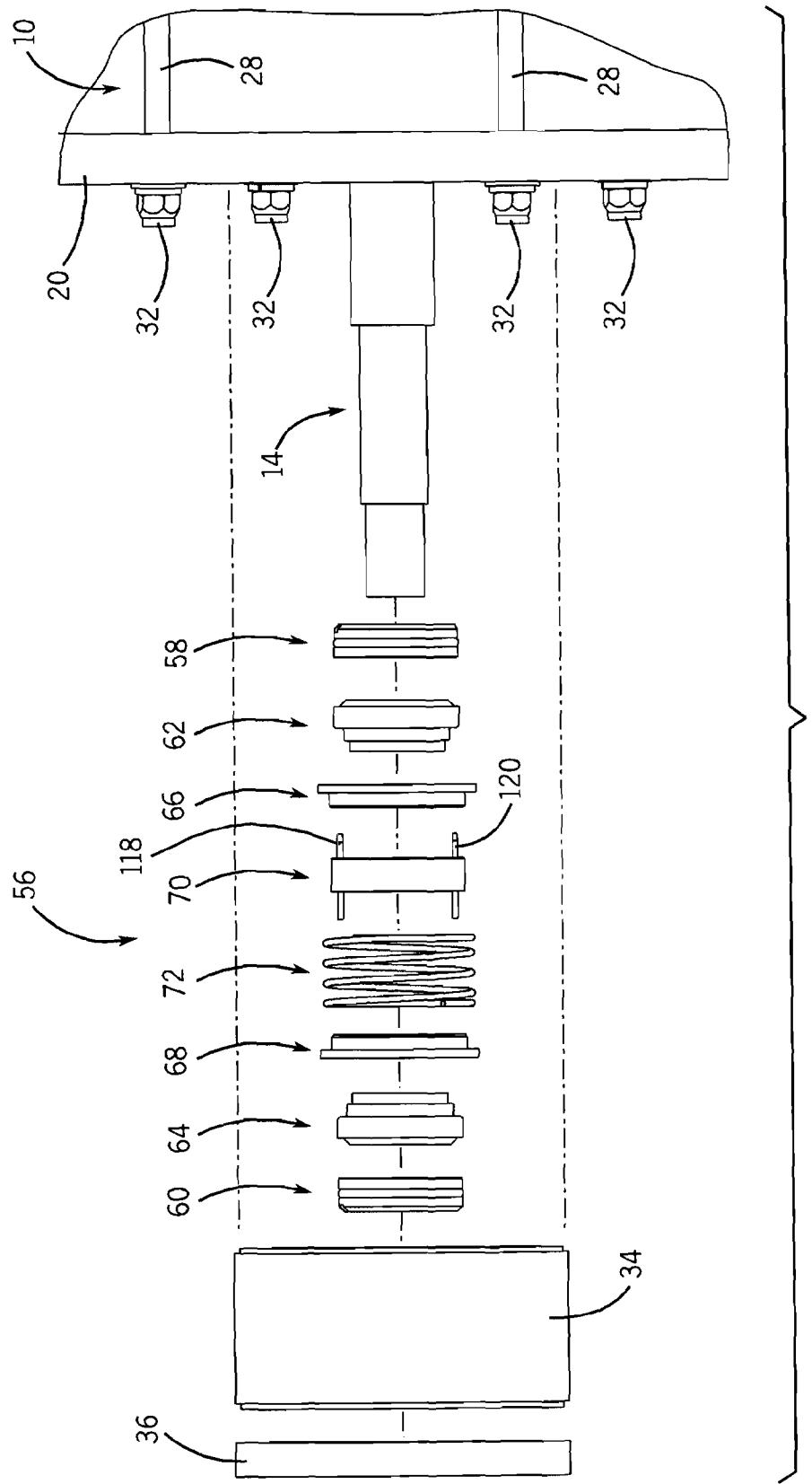
FIG. 2 is an exploded elevational view of the seal assembly.
Figure 3:
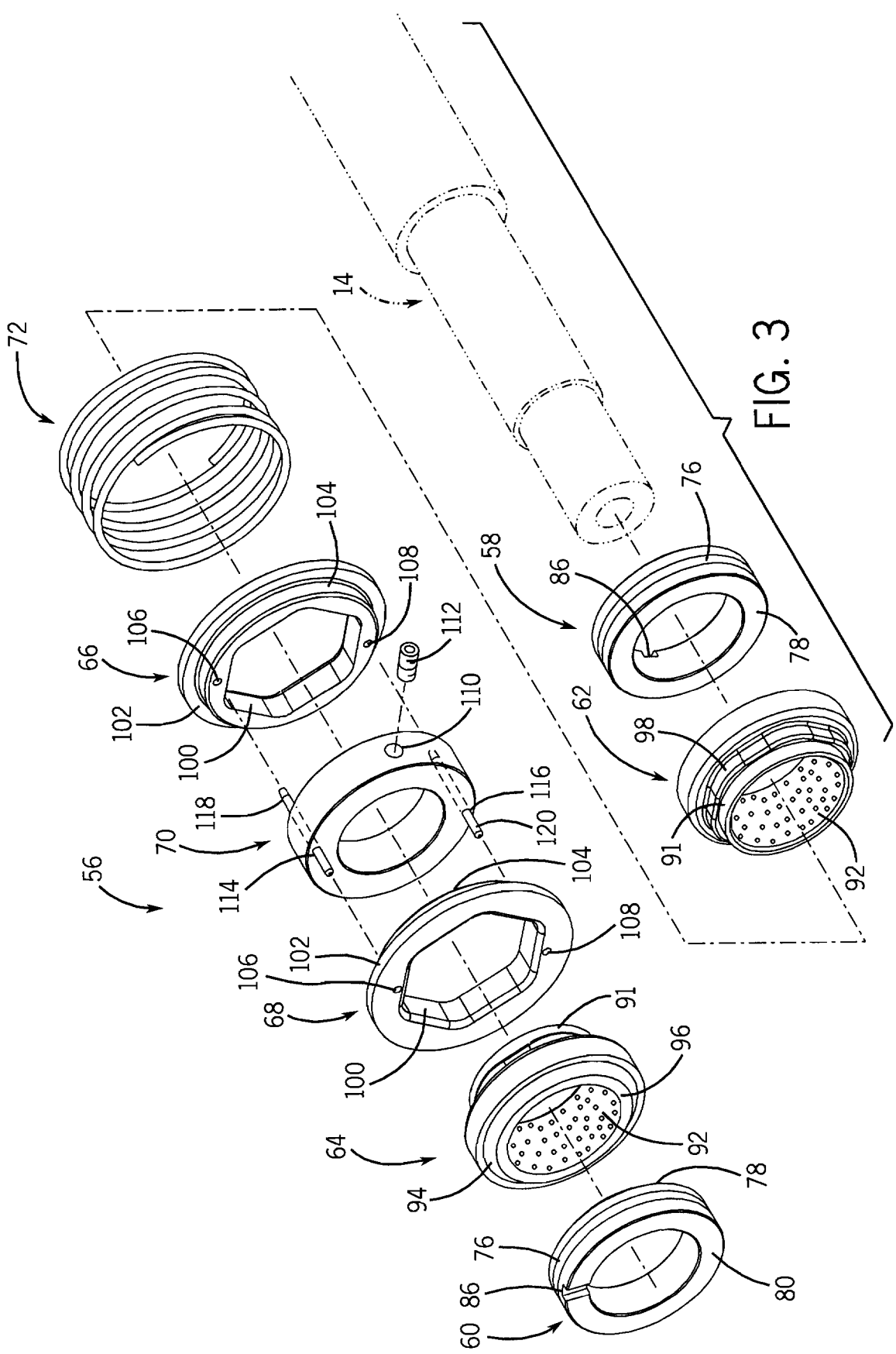
FIG. 3 is an exploded perspective view of the seal assembly.

A driven seal assembly 56 forming the present invention is mounted on the drive shaft 14 and enclosed in the seal housing 22 for preventing leakage of water along the drive shaft 14 and into the seal housing 22 and the motor housing 10. Referring now to FIGS. 2 and 3, the driven seal assembly 56 includes a pair of identical stationary seal seats 58, 60, a pair of identical rotary seals 62, 64, a pair of identical rotor drivers, 66, 68, a set collar 70, and a coil spring 72, all of which encircle shaft 14. The stationary seal seats 58, 60 and the rotary seals 62, 64 are commercially purchased components available from Flowserve Corporation of Irving, Tex. as assembly part 31-125-273.

The stationary seal seats 58, 60 have inner diameters that are slightly larger than the outside diameter of shaft 14 so that shaft 14 will pass freely through the stationary seal seats 58, 60. Both of the stationary seal seats 58, 60 also commonly have an O-ring 74 interposed in an external groove 76 between an inner face 78 and an outer face 80, and are designed to be press fit and non-rotatably mounted to the motor housing top plate 20 and the seal housing top plate 36. More particularly, as seen in FIG. 4, inboard stationary seal seat 58 is frictionally retained in a bore 82 formed in top plate 20 that opens from central opening 46 into a larger diameter than central opening. The seal seat 58 is prevented from rotating by means of a screw 84 that is inserted into the top plate 20 and engaged with a notch 86 on an outer face 80. Similarly, outboard stationary seal seat 60 is frictionally retained in a bore 88 formed in a seal housing top plate 36 that communicates with central recess 50. The seal seat 60 is restrained against rotation by a screw 90 which extends into the top plate 36 and engages a notch 86 on outer face 80.

The rotary seals 62, 64 have inner rings 91 lined with rubber surfaces 92 (FIG. 3) than snugly engage the outer diameter of shaft 14 in a tight frictional fit to support rotation of the rotary seals upon rotation of the driven shaft 14. The rotary seals 62, 64 further have tapered portions 94 with outer planar faces 96 for contacting the inner planar faces 78 of stationary seal seats 58, 60. and inner hexagonally-shaped bosses 98 which are matingly received by walls 100 of hexagonally-shaped cavities formed in the rotor drivers 66, 68. That is, inboard rotary seal 62 is positioned adjacent inboard stationary seal seat 58 so that a flat sealing surface is created between outer face 96 and inner face 78. Inboard rotary seal boss 98 is drivingly engaged with the walls 100 of the cavity in inboard rotor driver 66. Outboard rotary seal 64 is juxtaposed against outboard stationary seal seat 60 so that a flat sealing surface is defined between outer face 96 and inner face 78. Outboard rotary seal boss 98 is keyed into the walls 100 of cavity of outboard rotor driver 68.

The rotor drivers 66, 68 have commonly shaped outer circular crowns 102 integrally formed with inner step down, annular necks 104 with the shaft 14 passing through the hexagonal cavities formed therein. The rotor drivers 66, 68 are provided with a pair of axially extending pin apertures 106, 108 formed completely through the crowns 102 and necks 104 of the rotor drivers 66, 68 and spaced substantially 180 degrees apart.

The set collar 70 surrounds shaft 14 and is interposed between the necks 104 of rotor drivers 66, 68. The set collar 70 includes a pair of radially extending holes (one being seen at 110) through which set screws (such as 112) are inserted to secure the set collar 70 around shaft 14. A pair of axially extending pin holes 114, 116 is formed through the set collar 70 for frictionally retaining a pair of drive pins 118, 120 spaced substantially 180 degrees apart. The drive pins 118, 120 project bi-directionally beyond planar faces of the set collar 70 with end portions being inserted into registering apertures 106, 108 on the rotor drivers 66, 68 flanking the set collars 70.

Coil spring 72 surrounds the set collar 70 and the necks 104 of the rotor drivers 66, 68 and is compressed between inner faces 122 of the crowns 102 which extend radially beyond the necks 104 of the rotor drivers 66, 68. The spring 72 creates constant bidirectional axial forces against the rotor drivers 66, 68 which, in turn, constantly urge the rotary seals 62, 64 keyed thereto outwardly against the stationary seal seats 58, 60 so that water is kept outside seal housing 22 and motor housing 10.

In use, when motor 12 drives shaft 14, it can be understood that the constant bi-directional axial forces acting on rotary seals 62, 64 against stationary seal seats 58, 60 create tight sealing of bore 82 in motor housing top plate 20 and bore 88 in seal housing top plate 36. Leakage along shaft 14 is prevented by the tight fit of rotor seal rubber surfaces 92 acting on the outer diameter of shaft 14. In addition, as shaft 14 is driven, the set collar 70 rotates causing pins 118, 120 to drive rotor drivers 66, 68 and rotary seals 62, 64 keyed thereto so that sealing is maintained between the planar faces 78, 96 of the rotary seals 62, 64 and stationary seal seats 58, 60. That is, the set collar 70, pins 118, 120, rotary drivers 66, 68 and rotary seals 62, 64 form a positive drive mechanism for the seal assembly 56. This positive drive mechanism prevents slippage of the shaft 14 relative to the rotary seals 56, 58 which formerly occurred during motor shaft rotation. Such slippage would be accompanied by heat generation causing a groove to wear in the shaft 14, possible locking between the rotary seals and the stationary seal seats, loss of the supple fit of the rotary seals and eventual leakage of water along the shaft 14 and into the seal and motor housings 22 and 10 respectively. The present invention uses the positive drive mechanism in combination with the bi-directional axial forces exerted by the spring 72 upon the rotor drivers 66, 68 and rotary seals 62, 64 to alleviate slippage and wear problems, and prevent water from migrating along the shaft 14 into the motor housing 10.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

What is claimed is:

1. In a driven seal assembly for a shaft rotated by a motor disposed in a motor housing and having a seal housing adjacent to the motor housing through which the shaft extends, there being a first stationary seal seat mounted on the shaft and secured in a bore of the seal housing, a first rotary seal frictionally fit on the shaft adjacent the first stationary seal seat, a second stationary seal seat mounted on the shaft and secured in a bore of the motor housing, a second rotary seal frictionally fit on the shaft adjacent the second stationary seal seat, the improvement wherein:
    a positive drive mechanism is mounted on the shaft between the first and second rotary seals in a driving, mating relationship therewith and includes a first driving element in driving engagement with the first rotary seal and a second driving element in driving engagement with the second rotary seal; and
    a spring is placed in compression between the first and second driving elements to provide a bi-directional axial force on the first and second driving elements to press the first and second rotary seals against the first and second stationary seal seats,
    whereby the first and second driving elements are drivingly connected together independently of the spring for rotation with the shaft by a driving arrangement engaged by the first and second rotary seals.

2. The improvement of claim 1, wherein the positive drive mechanism includes a third driving element fixed to the shaft between the first and second driving elements and encircled by the spring.

3. The improvement of claim 2, wherein the third driving element is connected by pins to the first and second driving elements.

4. The improvement of claim 1, wherein the spring encircles axially extending portions of the first and second driving elements.

5. The improvement of claim 4, wherein the spring has opposite ends engaged against portions of the first and second driving elements extending radially from the axially extending portions.

6. The improvement of claim 1, wherein the first and second driving elements are formed with non-circular cavities for receiving mating non-circular portions of the first and second rotary seals.

7. The improvement of claim 6, wherein the shaft passes freely through the cavities of the first and second driving elements.

8. A driven seal assembly for a shaft rotated by a motor disposed in a motor housing and having a seal housing adjacent the motor through which the shaft extends, the driven seal assembly comprising:
    a first stationary seal seat mounted on the shaft and secured in a bore of the seal housing;
    a first rotary seal frictionally fit on the shaft adjacent the first stationary seal seat;
    a first rotor driver mounted on the shaft in mating relationship with the first rotary seal;
    a second stationary seal seat mounted on the shaft and secured in a bore.of the motor housing;
    a second rotary seal frictionally fit on the shaft adjacent the second stationary seal seat;
    a second rotor driver mounted on the shaft in mating relationship with the second rotary seal;
    a set collar attached to the shaft for rotation therewith between the first and second rotor drivers and drivingly connected thereto; and
    a spring of substantially constant diameter surrounding the set collar in spaced relationship therefrom and placed in compression between the first and second rotor drivers,
    whereby the set collar is drivingly connected to the first and second rotor drivers independently of the spring,
    whereby the spring exerts bi-directional forces causing the first and second rotary seals to engage the first and second stationary seal seats, and
    wherein the set collar, the first and second rotor drivers and the first and second rotary seals define a positive drive mechanism for urging the first and second rotary seals against the first and second stationary seal seats upon rotation of the shaft.

9. The driven seal assembly of claim 8, wherein the first and second stationary seal seats are press fit and non-rotatably mounted in the bores of the seal and motor housings, respectively.

10. The driven seal assembly of claim 8, wherein the first and second rotary seals are lined with rubber surfaces that seal against an outer periphery of the shaft.

11. The driven seal assembly of claim 8, wherein the first and second rotary seals include multi-sided bosses.

12. The driven seal assembly of claim 11, wherein the first and second rotor drivers have a multi-sided wall structure matingly engageable with the multi-sided bosses on the first and the second rotary seals.

13. The driven seal assembly of claim 8, wherein each of the first and second rotor drivers has a circular crown integrally formed with an annular neck having a diameter less than a diameter of the crown.

14. The driven seal assembly of claim 13, wherein the spring surrounds the necks of the first and second rotor drivers and has opposite ends engaged against inner faces of the circular crowns of the first and second rotor drivers.

15. The driven seal assembly of claim 8, wherein each rotor driver is formed with a pair of axially extending apertures spaced substantially 180 degrees apart.

16. The driven seal assembly of claim 15, wherein the set collar is provided with a pair of axially extending pins that are received in the rotor driver apertures.

17. The driven seal assembly of claim 8, wherein the set collar is attached to the shaft by at least one set screw.

18. A driven seal assembly for a shaft rotated by a motor, the driven seal assembly comprising:
- a first rotary seal frictionally fit on the shaft;
- a first rotor driver mounted on the shaft in mating relationship with the first rotary seal, the first rotor driver being freely movable along the length of the shaft;
- a second rotary seal frictionally fit on the shaft;
- a second rotor driver mounted on the shaft in a mating relationship with the second rotary seal, the second rotor driver being freely movable along the length of the shaft;
- a set collar attached to the shaft for rotation therewith, the set collar being positioned between the first and second rotor driver and drivingly connected thereto; and
- a spring of substantially constant diameter surrounding the set collar in spaced relationship therefrom and placed in compression between the first and second rotor drivers, whereby the spring exerts a bi-directional force on the first rotor driver and the second rotor driver into engagement with the first and second rotary seal, and
- whereby the set collar is drivingly connected to the first and second rotor drivers independently of the spring.

19. The driven seal assembly of claim 18 wherein the set collar is fixedly attached to the shaft by at least one set screw and includes a pair of axially extending pins that are received in the first and second rotor drivers.

20. The driven seal assembly of claim 19 wherein the first and second rotary seals include multi-sided bosses and the first and second rotor drivers each include a multi-sided wall structure matingly engageable with the multi-sided bosses on the first and second rotary seals.

* * * * *